United States Patent [19]

Coursey

[11] Patent Number: 5,511,850
[45] Date of Patent: Apr. 30, 1996

[54] CHILD'S AUTOMOBILE SAFETY SEAT

[76] Inventor: Jimmy M. Coursey, 310 E. Gordon Ave., Lyons, Ga. 30436

[21] Appl. No.: 367,854

[22] Filed: Jan. 3, 1995

[51] Int. Cl.$^6$ ..................................................... B60N 2/28
[52] U.S. Cl. .................. 297/216.11; 297/256.15; 297/488; 297/DIG. 3
[58] Field of Search ............... 297/256.15, 250.1, 297/216.11, 216.1, DIG. 3, 488, 487, 284.6

[56] References Cited

U.S. PATENT DOCUMENTS

| | | | |
|---|---|---|---|
| 2,690,787 | 10/1954 | Soltis | 297/250.1 X |
| 3,762,766 | 10/1973 | Barecki et al. | 297/284.1 X |
| 4,186,962 | 5/1980 | Meeker | 297/250 |
| 4,215,900 | 8/1980 | Coult | 297/254 |
| 4,568,122 | 2/1986 | Kain | 297/488 |
| 4,632,456 | 12/1986 | Kassai | 297/328 |
| 4,643,474 | 2/1987 | Wise et al. | 297/488 X |
| 4,679,806 | 7/1987 | Gingline | 297/488 X |
| 4,685,741 | 8/1987 | Tsuge et al. | 297/250.1 X |
| 4,687,255 | 8/1987 | Klanner et al. | 297/488 |
| 4,834,420 | 5/1989 | Sankrithi et al. | 297/250.1 X |
| 4,943,113 | 7/1990 | Meeker | 297/250.1 X |
| 5,004,253 | 4/1991 | Nakao et al. | 297/488 X |
| 5,286,091 | 2/1994 | Busch | 297/464 X |
| 5,375,908 | 12/1994 | Goor | 297/256.15 X |

*Primary Examiner*—Milton Nelson, Jr.
*Attorney, Agent, or Firm*—Henry S. Miller; Rhodes & Ascolillo

[57] ABSTRACT

A children's automobile safety seat including an L-shaped frame, a seat portion and a backrest portion constructed as an integral unit, both of which are connected to the L-shaped frame. A padded, C-shaped safety bar is attached to the L-shaped frame such that the safety bar is disposed in a generally horizontal plane which is parallel to the seat portion. There is a pivoting mechanism for pivotally connecting a first end of the safety bar to a first side of the L-shaped frame, and a disconnecting mechanism for detachably connecting a second end of the safety bar to a second side of the L-shaped frame. A first air bag is stored within the safety bar, and a second air bag is stored within the seat portion.

3 Claims, 3 Drawing Sheets

CHILD'S AUTOMOBILE SAFETY SEAT

BACKGROUND OF THE INVENTION

1. Field of the Invention

The present invention relates generally to an automobile safety seat for children and, more particularly, to a seat having a pivotally detachable safety bar and double air bag protection.

2. Description of the Related Art

U.S. Pat. No. 4,186,962 issued to P. Meeker on Feb. 5, 1980 relates to a rigid support and restraining stand for an infant car seat having opposed legs pivotally mounted to the seat. A bight member is connected to the opposed legs by associated rod members. The rod members and legs form an acute angle whereby the bight member firmly grasps the front edge of the auto seat when the infant car seat is in a rearward facing position.

U.S. Pat. No. 4,215,900 issued to J. Coult on Aug 5, 1980 discloses a safety seat with interconnecting legs and a frame structure which is removably mounted to a vehicle passenger seat. The seat is mounted to the frame by a rotation mechanism adapted to an intermediate structure. A hydraulic cylinder is used as a deceleration mechanism to retard rotation of the seat upon application of external forces.

U.S. Pat. No. 4,568,122 issued to J. Kain on Feb. 4, 1986 relates to an automobile booster seat having a unitary seat portion, upwardly extending sidewalls, and a tubular frame above the sidewalls. The seat is provided with an outer channel for accepting an automobile seat belt so as to maintain the seat firmly against the automobile seat when the seat belt is secured.

U.S. Pat. No. 4,632,456 issued to K. Kassai on Dec. 30, 1986 discloses a children's automobile-mounted safety seat having a body support with a seat portion, a base, and reclining adjustment members for adjusting the angle of inclination of the body support portion. A journal shaft connects the seat portion to the base and is positioned in a cavity located in the base.

It is well recognized that safety standards with respect to automobile design are increasingly more stringent. By the end of the decade, every automobile manufactured in the United States will come equipped with both driver's and passenger's side air bags. In a similar manner, more attention is also being paid to new and improved designs for child safety seats which attach to existing automobile seats.

Apparatus such as those disclosed in the above identified patents all address, in various embodiments, ways of improving the securing means by which a child booster seat is mated with an existing automobile passenger seat. However, all of those devices employ passive restraint systems (i.e. seatbelt mechanisms) by which the child is protected from injury upon a collision. In contrast, the present invention attempts to duplicate, in a child's vehicle booster seat, the protections afforded by newer automobiles by including strategically located air bags within the seat itself in order to better protect the upper and lower extremities of the child.

SUMMARY OF THE INVENTION

Accordingly, it is a principal object of the present invention to provide a child's automobile mounted safety seat which is equipped with its own set of airbags.

It is a further object of the invention to provide such a seat which employs a first airbag to protect the upper extremities of a child and a second airbag to protect the lower extremities of the child.

It is still a further object of the present invention to provide a vehicle safety seat which has a pivotally detachable safety bar which allows easier access of the child to and from the seat.

The present invention achieves the above objects, among others, by providing in one aspect a children's automobile safety seat, including an L-shaped frame, a seat portion and a backrest portion constructed as an integral unit, both of which are connected to the L-shaped frame. A C-shaped safety bar is attached to the L-shaped frame such that the safety bar is disposed in a generally horizontal plane which is parallel to the seat portion. The safety bar has a first end pivotally connected to a first side of the L-shaped frame and a second end detachably connected to a second side of the L-shaped frame. In this manner, the safety bar may freely pivot along the generally horizontal plane when the second end is detached from the L-shaped frame.

Preferably, the safety seat also includes a first air bag housed within the safety bar, and a second air bag housed within the seat portion. A depressible release button is located on the second side of said L-shaped frame to allow the second end of the safety bar to be released and freely pivot.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
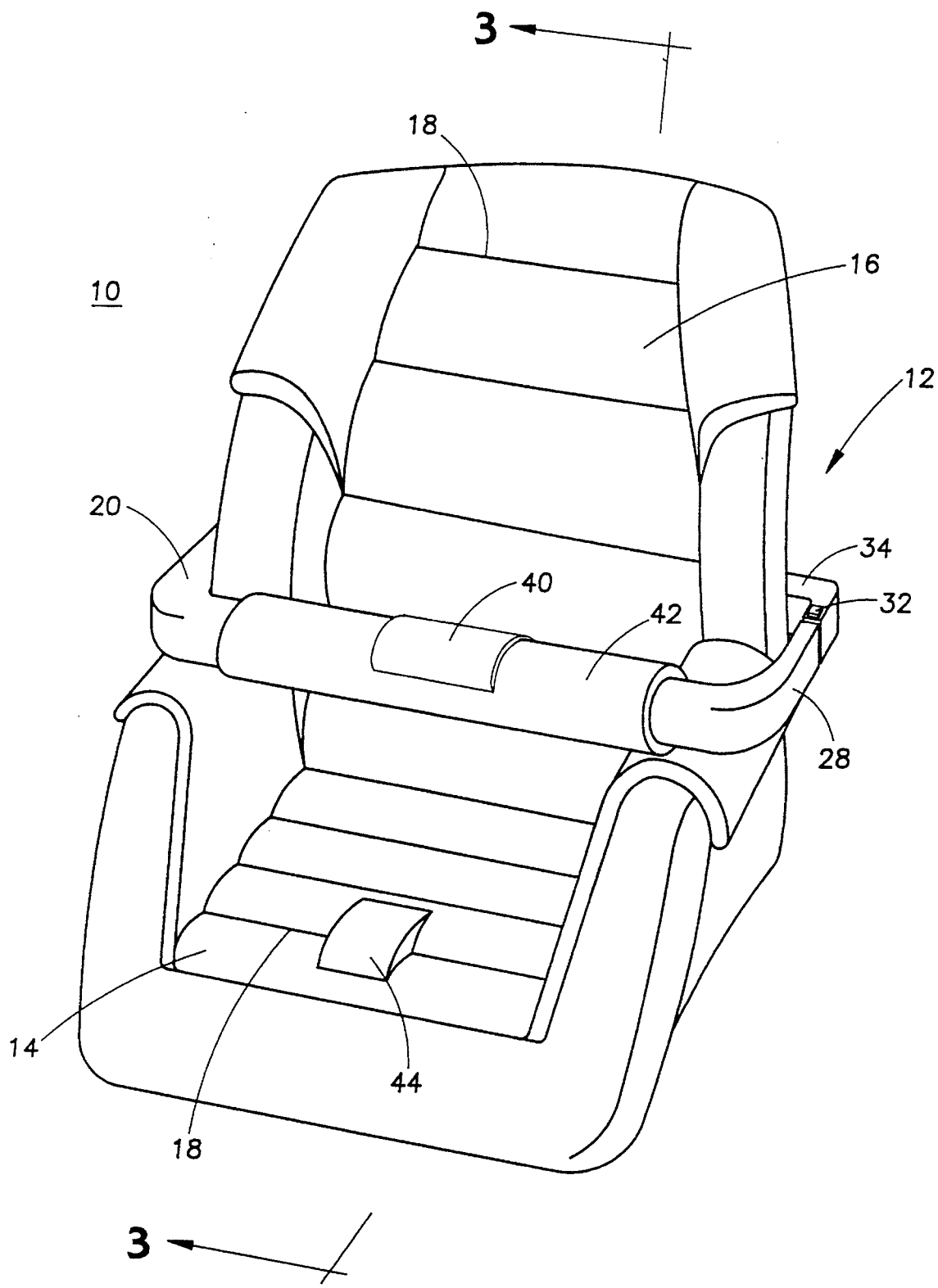
FIG. 1 is a perspective view of an automobile-mounted child safety seat according to the present invention.

Referring initially to FIG. 1, there is shown an automobile-mounted safety seat for children and infants, generally designated by the reference numeral 10. The safety seat 10 includes a generally L-shaped frame 12, to which an integrally constructed seat portion 14 and backrest portion 16 are affixed. The frame 12 is preferably constructed from durable, molded plastic material; however, lightweight metallic alloys, such as aluminum, are also acceptable. The seat and backrest portions 14, 16 may be furnished with ribbed foam cushioning 18, as is typically used for the passenger seats 100 in automobiles, and may be attached to the frame 12 with standard fasteners or rivets located along molded attachment points thereon.

Figure 2:
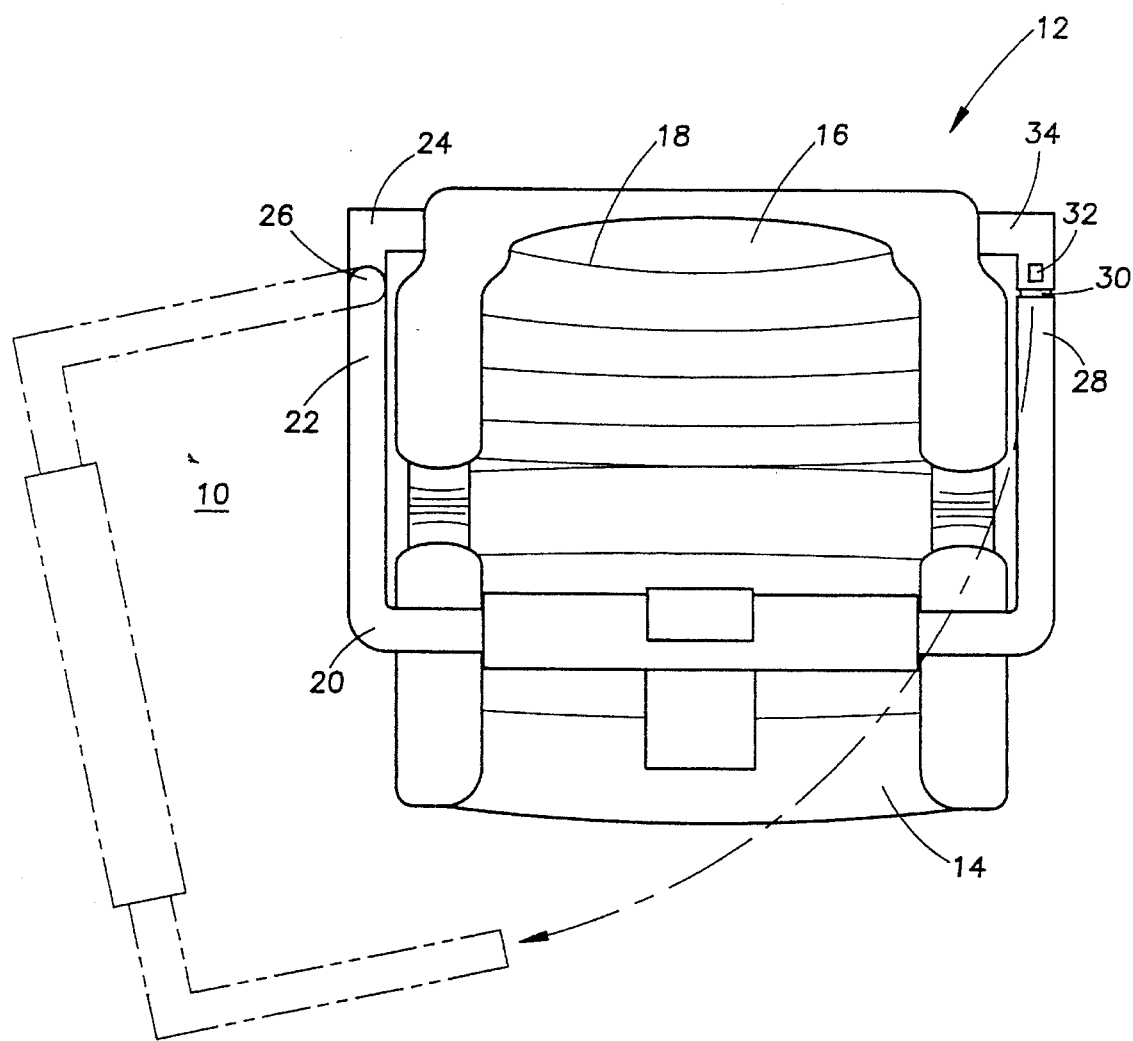
FIG. 2 is a plan view of the safety seat which also shows the pivoting motion of the C-shaped safety bar.

Positioned approximately midway across the L-shaped frame 12 is a C-shaped safety bar 20. As is best seen in FIG. 2, the safety bar 20 has a first end 22 which is pivotally attached to a first end 24 of the L-shaped frame 12 by means of a hinged joint 26. Joint 26 allows the safety bar 20 to freely pivot along a substantially horizontal plane parallel to the seat portion 14. Located at a second end 28 of the safety bar 20 is a disconnect mechanism 30 which is activated by depressing a release button 32 mounted on a second end 34 of the L-shaped frame 12. The disconnect mechanism 30 functions essentially the same way as an ordinary seat belt buckle, which is well known in the art. Mechanism 30 allows a parent to quickly and easily disconnect the safety bar 20 for placement or removal of the child within the seat 10.

Figure 3:
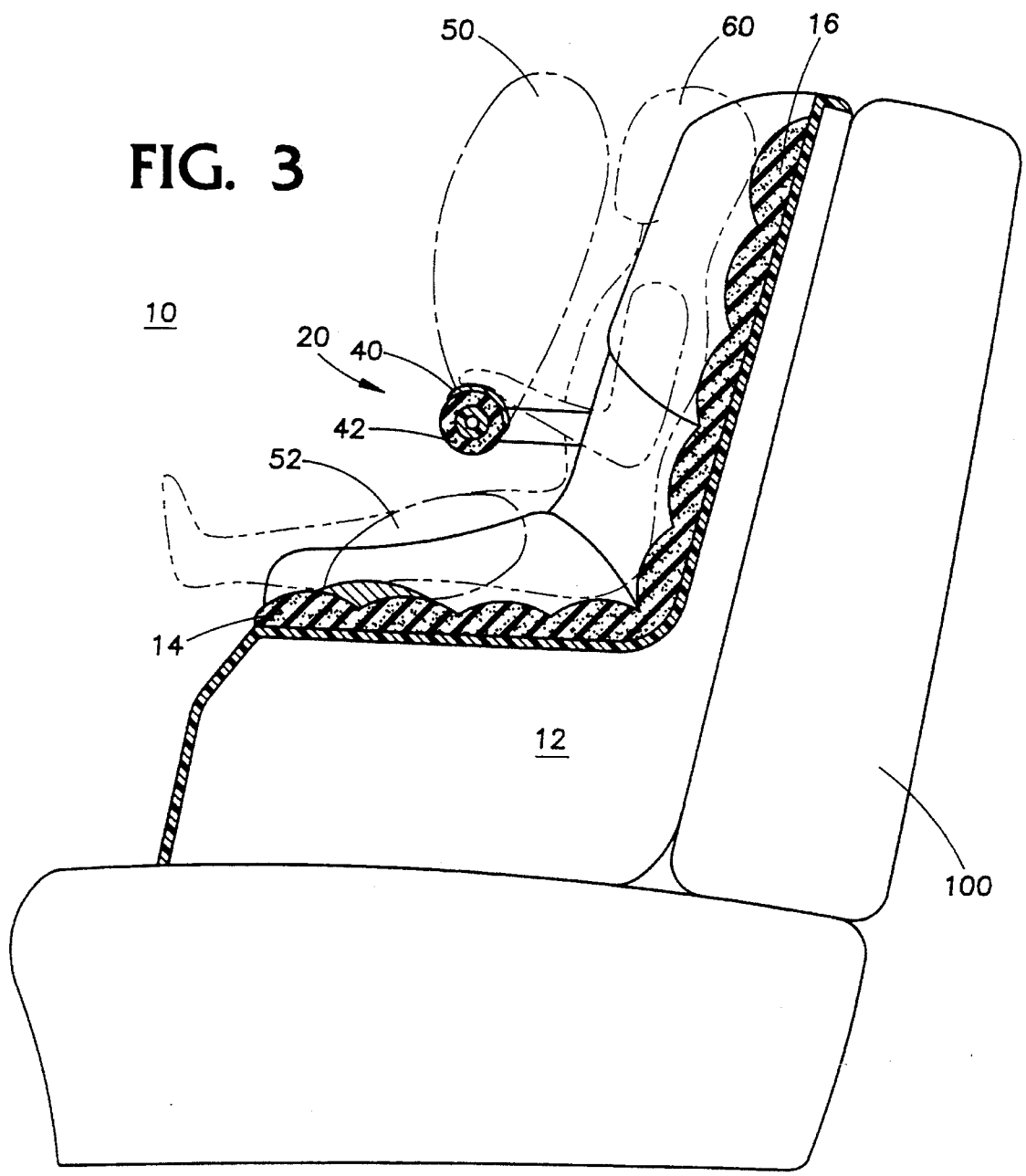
FIG. 3 is a side view, taken along lines 3—3 of FIG. 1, which illustrates the deployment of the double air bags while the seat is occupied by an infant.

Most importantly, however, the seat 10 features a first air bag compartment 40 centrally disposed within a padded portion 42 of the safety bar 20. Padded portion 42 may be attached to the safety bar 20 through any suitable commercial method, such as adhesive strips or glues. In addition, a second air bag compartment 44 is also provided within the seat portion 14 of the seat 10. Both air bag compartments 40, 44 contain air bags therewithin, the air bags being of the same type used in the steering wheels of ordinary automobiles. The deployment of both airbags is best seen in FIG. 3. Upon significant impact caused by an automobile collision, air bags 50 and 52 are inflated through conventional methods known in the art, such as carbon dioxide gas canisters. The first air bag 50, located within (and attached to) safety bar 20, serves to protect the upper extremities (head and chest) of the infant 60, while the second air bag 52, located within (and attached to) seat portion 14, serves to protect the lower extremities (crotch area) of the infant 60.

Finally, it should be noted that the air bags 50 and 52 should be supplied with ordinary but well known activation mechanisms not shown here (such as "air over mechanical" or "air over electrical" pressure devices) which are easily accessible to the owner or other passengers of the vehicle.

It will thus be seen that the objects set forth above, among those elucidated in, or made apparent from, the preceding description, are efficiently attained. Since certain changes may be made in the above construction without departing from the scope of the invention, it is intended that all matter contained in the above description or shown on the accompanying drawing shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A children's automobile safety seat, comprising:

an L-shaped frame;

a seat portion and a backrest portion constructed as an integral unit, both of which are connected to the L-shaped frame;

a padded, C-shaped safety bar attached to the L-shaped frame such that the safety bar is disposed in a generally horizontal plane which is parallel to the seat portion;

pivoting means for pivotally connecting a first end of said safety bar to a first side of the L-shaped frame;

disconnecting means for detachably connecting a second end of said safety bar to a second side of the L-shaped frame;

a first air bag housed within said safety bar and automatically deployable therefrom; and a second air bag housed within said seat portion and automatically deployable therefrom.

2. The automobile safety seat as described in claim 1, wherein said first air bag is centrally located within said padded C-shaped safety bar and protects the upper extremities of an infant during inflation of said first air bag caused by collision.

3. The automobile safety seat as described in claim 2, wherein said second air bag is substantially centrally located within said seat portion and protects the lower extremities of an infant during inflation of said air bag.

\* \* \* \* \*